(12) United States Patent
Milani

(10) Patent No.: US 8,308,937 B2
(45) Date of Patent: Nov. 13, 2012

(54) GREY WATER DIVERSION SYSTEM

(75) Inventor: Samandar Milani, Floreat (AU)

(73) Assignee: Advanced Waste Water Systems (AU)

( * ) Notice: Subject to any disclaimer, the term of this patent is extended or adjusted under 35 U.S.C. 154(b) by 545 days.

(21) Appl. No.: 12/534,697

(22) Filed: Aug. 3, 2009

(65) Prior Publication Data

US 2011/0024338 A1    Feb. 3, 2011

(51) Int. Cl.
*B01D 29/66*      (2006.01)
*E03C 1/12*       (2006.01)

(52) U.S. Cl. ........ 210/108; 210/127; 210/128; 210/253; 210/258

(58) Field of Classification Search ............ 210/106, 210/108, 96.1, 127, 128, 253, 258, 410
See application file for complete search history.

(56) References Cited

U.S. PATENT DOCUMENTS

| | | | |
|---|---|---|---|
| 3,288,294 A * | 11/1966 | Frey | 210/134 |
| 5,106,493 A | 4/1992 | McIntosh | |
| 5,403,498 A | 4/1995 | Morrissey et al. | |
| 5,498,330 A | 3/1996 | Delle Cave | |
| 5,759,387 A | 6/1998 | Wilkes | |
| 6,139,729 A | 10/2000 | Gonzalez, Jr. | |
| 6,355,160 B1 | 3/2002 | Wiseman et al. | |
| 2004/0035768 A1 * | 2/2004 | Bertram | 210/112 |

FOREIGN PATENT DOCUMENTS

| | | |
|---|---|---|
| AU | 2007100605 A4 | 8/2007 |
| AU | 2007100768 A4 | 9/2007 |
| JP | 11-114319 A | 4/1999 |
| WO | WO 2011/061632 A2 | 5/2011 |
| WO | WO 2011/061632 A3 | 10/2011 |

OTHER PUBLICATIONS

PCT International Search Report mailed on Jul. 26, 2011 for PCT/IB2010/003536.

* cited by examiner

*Primary Examiner* — Terry Cecil
(74) *Attorney, Agent, or Firm* — Hitchcock Evert LLP

(57) ABSTRACT

A grey water diversion system is provided. An interceptor includes an inlet, a filter, an outlet, and an orifice. The filter is located along a bottom of a water flow path from the inlet to the outlet and delivers water to the orifice as filtered water. A gas pump, connected to a filter stem, delivers gas to the stem via the stem when the system detects the presence of the water. The gas rises through the filter to raise debris from the filter to the water flow path. A water overflow delivers the debris to the outlet. A suction manifold, including a sensor, receives the filtered water from the orifice. The sensor detects the presence of the filtered water. A water pump receives the filtered water from the manifold, activates when the sensor detects the presence of the filtered water, and delivers the filtered water into a water usage system.

11 Claims, 1 Drawing Sheet

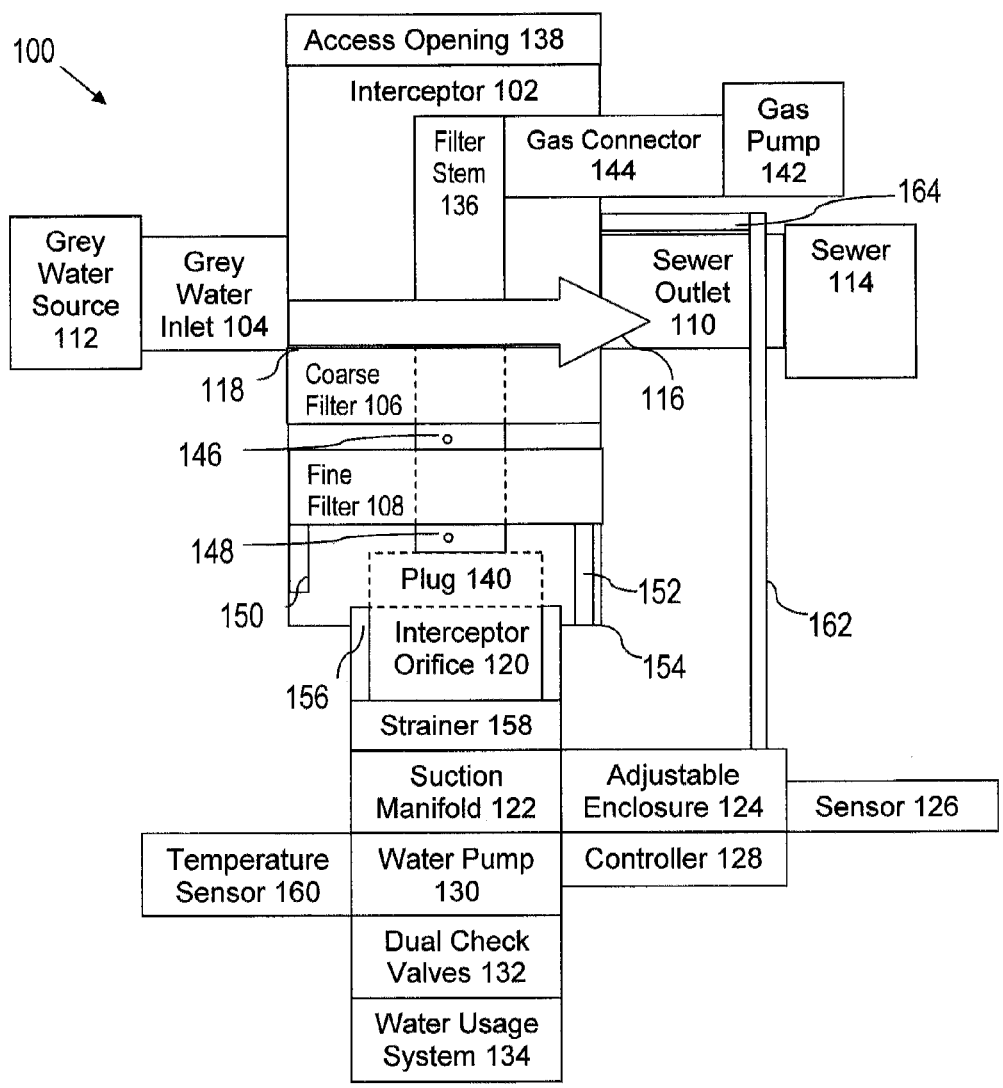

GREY WATER DIVERSION SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Household wastewater may be generally classified as either black water or grey water. Black water generally refers to waste water generated from toilets and garbage disposals that is directed to a septic or sewage system. Grey water, which is sometimes spelled "gray water," generally refers to waste water generated from sinks, bath tubs, showers, and clothes washers. Because black water typically contains high levels of solids and bacteria, black water may not be suitable for reuse before being processed through a wastewater treatment facility. However, because grey water typically contains relatively small amounts of solids, bacteria, soaps, and detergents, grey water may be processed within a short period of time through a simple filtering system to be safe for non-potable reuse, such as outdoor irrigation. Based on the scarcity of water in various parts of the world, grey water diversion systems have been in operation for many years.

SUMMARY

In some embodiments, a grey water diversion system is provided. An interceptor includes a grey water inlet, a filter, a sewer outlet, and an interceptor orifice. The filter is located along the bottom of the water flow path from the grey water inlet to the sewer outlet and delivers grey water to the interceptor orifice as filtered grey water. A gas pump is connected to a filter stem and delivers gas to the filter via a filter stem when the grey water diversion system detects the presence of the grey water. The gas rises through the filter to raise debris from the filter to the flow path. A grey water overflow delivers the debris to the sewer outlet. A suction manifold, including a sensor, receives the filtered grey water from the interceptor orifice. The sensor detects the presence of the filtered grey water. A water pump receives the filtered grey water from the suction manifold. The water pump activates when the sensor detects the presence of the filtered grey water and delivers the filtered grey water into a water usage system.

In some embodiments, a grey water diversion system is provided. An interceptor includes a grey water inlet, a filter, a sewer outlet, and an interceptor orifice. The filter is located along the bottom of the water flow path from the grey water inlet to the sewer outlet and delivers grey water to the interceptor orifice as filtered grey water. The interceptor orifice is aligned with a central orifice of the filter. The central orifice of the filter accepts a filter stem that is accessible via an access opening to remove the filter. The interceptor also includes a member located as to prevent the filter and/or the filter stem from impeding flow to the interceptor orifice. A suction manifold, including a sensor, receives the filtered grey water from the interceptor orifice. The sensor detects the presence of the filtered grey water. A water pump receives the filtered grey water from the suction manifold, activates in response to the sensor detecting the presence of the filtered grey water, and delivers the filtered grey water into a water usage system.

In some embodiments, a grey water diversion system is provided. An interceptor includes a grey water inlet, a filter, a sewer outlet, and an interceptor orifice. The filter is located along the bottom of the water flow path from the grey water inlet to the sewer outlet and delivers grey water to the interceptor orifice as filtered grey water. A suction manifold, including a sensor, receives the filtered grey water from the interceptor orifice. The sensor detects the presence of the filtered grey water. An oil-cooled water pump receives the filtered grey water from the suction manifold, activates when the sensor detects the presence of the filtered grey water, and delivers the filtered grey water into a water usage system. The oil-cooled pump includes a temperature sensor that disables the oil-cooled water pump when the temperature of the oil-cooled water pump exceeds a predetermined threshold.

These and other features will be more clearly understood from the following detailed description taken in conjunction with the accompanying drawing and claims.

BRIEF DESCRIPTION OF THE DRAWING

For a more complete understanding of the present disclosure, reference is now made to the following brief description, taken in connection with the accompanying drawing and detailed description.

FIG. 1 is a block diagram of a grey water diversion system according to some embodiments of the present disclosure.

DETAILED DESCRIPTION

It should be understood at the outset that although illustrative implementations of one or more embodiments are illustrated below, the disclosed systems may be implemented using any number of techniques, whether currently known or in existence. The disclosure should in no way be limited to the illustrative implementations, drawing, and techniques illustrated below, but may be modified within the scope of the appended claims along with their full scope of equivalents.

Typical grey water diversion systems have certain drawbacks which have influenced their marketability. A typical grey water diversion system includes a filter for separating the solids, hair, and fibrous material generally associated with the washing of clothes and the cleaning of the human body. In typical systems, it is necessary to remove these materials from the filter on a frequent basis, which may create problems. The mess and frequency of manually cleaning filters is constant, such that many potential customers choose not to perform these tasks on a regular basis. The possibility exists that a grey water diversion system would fall into disuse by homeowners who would tire of the problems associated with caring for a system which requires the manual cleaning of filters.

Other types of water filtration systems may backwash their filters to address filter cleaning problems. In order to backwash a filter, normally a large flow of clean water is required to separate accumulated debris from the filter. Applying this technique to a typical grey water filter may require a source of more than 100 gallons of water and a large pump to deliver the required flow rates of backwash water. Obviously, in those situations where the use of grey water is desirable, the economics of such a grey water system is greatly diminished by the use of large amounts of clean water for backwashing.

In embodiments of the present disclosure, a grey water diversion system is provided. An interceptor includes a grey water inlet, a filter, a sewer outlet, and an interceptor orifice. The filter is located along the bottom of the water flow path from the grey water inlet to the sewer outlet and delivers grey water to the interceptor orifice as filtered grey water. The system may include a gas pump, such as an air pump, connected to a filter stem that passes through the filter. Occasionally when the grey water diversion system detects the presence of grey water, the gas pump delivers gas to the filter via the filter stem. The gas exiting the filter stem beneath the filter may rise through the underwater filter like aerating bubbles in a spa. The rising gas bubbles may raise accumulated debris from the top of the filter into the water flow path, where any grey water overflow may deliver the loosened debris to the sewer outlet. This partial self-cleaning action requires only a small amount of grey water and a short discharge of gas from the gas pump, in contrast to water filtration systems that use large capacity water pumps to deliver large amounts of clean or filtered grey water to backwash filters. Because the filter is backwashed automatically, such a backwash system may efficiently reduce the nuisance factor found in other backwash systems which are not fully automatic.

A typical grey water diversion system may include a filter stem for removing a filter for periodic inspections. Such a grey water diversion system may locate the filter stem in an off-center position as far away from an off-center interceptor orifice as possible to avoid impeding the flow of grey water to the off-center interceptor orifice. In contrast, embodiments of the present disclosure include both a central filter stem and a central interceptor orifice. The interceptor may include a member, such as a column or a support, located as to prevent the filter and/or the central filter stem from impeding flow to the central interceptor orifice. Furthermore, the central interceptor orifice may be easily plugged for maintenance by the central filter stem, which is located directly above the central interceptor orifice, in contrast to an off-center filter stem that may be rotated a significant amount in an attempt to locate and plug the off-center interceptor orifice. Orifice plugging for maintenance becomes much easier, but without the central filter stem or the filter impeding the flow of grey water to the central interceptor orifice.

In embodiments of the present disclosure, a suction manifold receives the filtered grey water from the interceptor orifice and a sensor in the suction manifold detects the presence of the filtered grey water. A water pump, which may be an oil-cooled water pump, receives the filtered grey water from the suction manifold. Although an oil-cooled water pump may be more expensive than a water-cooled water pump, the oil-cooled water pump may be less prone to overheating problems due to hot grey water received into the pump from washing machines and showers. When a sensor detects the presence of the filtered grey water, the water pump delivers the filtered grey water into a water usage system. A problem with debris in the pump, which is distinct from the hot grey water problem, may occur when debris enters the water pump and prevents the water pump from operating. To address this debris in the pump problem, a temperature sensor may disable the water pump when the temperature of the water pump exceeds a predetermined threshold, which prevents the water pump from damage. The oil-cooled water pump and/or the temperature sensor may preserve the operating life of the water pump by reducing problems caused by hot grey water or debris in the water pump, thereby saving expenses. Reducing maintenance, enabling easier maintenance, and preserving the operating life of the water pump may combine to enable the grey water diversion system to operate more efficiently and significantly reduce water expenses. While these are some advantages of the present system, various embodiments may not enjoy all of these benefits but still be within the scope of the present disclosure.

FIG. 1 is a block diagram of a grey water diversion system 100 according to some embodiments of the present disclosure. Although FIG. 1 depicts a block diagram that illustrates the main elements of the system 100, the system 100 may also include any numbers and types of pipes, tubes, and/or connectors to connect the main elements of the system 100. The system 100 includes an interceptor 102, which includes a grey water inlet 104, a filter 106, and a sewer outlet 110. Although the interceptor 102 may include a single filter 106, the interceptor 102 may also include a coarse filter 106 and a fine filter 108. Systems that use only a single fine filter may often experience the accumulation of coarse debris, such as hair and lint, mixed with fine debris, such as dust and dirt, which collectively may form an impermeable crust on top of the only filter. In contrast, the coarse filter 106 prevents the large debris from gravitating to the fine filter 108, and the fine filter 108 prevents the fine debris from exiting the interceptor 102. The use of the two different filters 106 and 108 prevents the accumulation of coarse debris mixed with fine debris, thereby reducing the possibility of the formation of the impermeable crust.

The system 100 also includes a grey water source 112 and a sewer 114. The interceptor 102 also includes a water flow path 116 from the grey water inlet 104 to the sewer outlet 110, a bottom 118 of the water flow path 116, and an interceptor orifice 120. The filter 106 is located along the bottom 118 of the water flow path 116 from the grey water inlet 104 to the sewer outlet 110 and delivers grey water to the interceptor orifice 120 as filtered grey water.

The interceptor orifice 120 delivers filtered grey water from the interceptor 102 to a suction manifold 122, which includes an adjustable enclosure 124 that includes a sensor 126, such as a float switch. The adjustable enclosure 124 may be adjusted to be situated at an angle of repose that determines an amount of grey water received by the suction manifold 122 before the sensor 126 detects the presence of the filtered grey water. By adjusting the angle of repose for the adjustable enclosure 124, the sensor 126 in the adjustable enclosure 124 may react more or less rapidly to the rising level of filtered grey water in the adjustable enclosure 124. The angle of repose for the adjustable enclosure 124 may be adjusted to reduce the sensitivity of the sensor 126 to the fluctuations of the filtered grey water without adjusting the angle of repose to the point that the sensor 126 would fail to detect the presence of the filtered grey water in the adjustable enclosure 124.

When the sensor 126 detects the presence of the filtered grey water, the sensor 126 triggers a controller 128, which activates a water pump 130 that pumps the filtered grey water from the suction manifold 122 through dual check valves 132 to a water usage system 134. The dual check valves 132 may prevent the filtered grey water from flowing back into the suction manifold 122 and reactivating the water pump 130. The adjustable enclosure 124 may be adjusted to respond to lower flow rates, such as when low flow shower heads and low flow taps provide the source of the grey water, without causing the water pump 130 to continually cycle on and off.

The controller 128 may be a programmable electronic control unit with a graphic user interface. The controller 128 may continue activation of the water pump 130 for a predetermined amount of time after the sensor 126 no longer detects the presence of the filtered grey water to insure that the water pump 130 delivers the filtered grey water in the suction manifold 122 and the adjustable enclosure 124 that the sensor 126 can no longer detect. During instances when high amounts of filtered grey water are delivered to the suction manifold 122, the controller 128 keeps the water pump 130 continually activated to pump the filtered grey water. During instances when medium amounts of filtered grey water are delivered to the suction manifold 122, the delayed deactivation of the water pump 130 by the controller 128 results in the water pump 130 continuing to pump the filtered grey water during the brief intervals when the sensor 126 no longer detects the presence of the filtered grey water. During instances when low amounts of filtered grey water are delivered to the suction manifold 122, the controller 128 activates and deactivates the water pump 130 to pump the filtered grey water based on when the sensor 126 detects the presence of the filtered grey water. The programmed delay deactivation time and the angle of repose of the adjustable enclosure 124 constitute the mechanism by which the pump 130 is kept uninterrupted during low flow events. The controller 128 also prevents activation of the water pump 130 if an activation sensor detects that the grey water has an electrical conductivity above an electrical conductivity threshold and/or a basicity measure (pH) above or below a basicity measure threshold, thereby preventing filtered grey water with a high sodium content or a high or low pH level from being recycled by the water usage system 134.

The water usage system 134 may include an irrigation system with distribution valves that distribute the filtered grey water based at least partially on soil moisture sensors. The controller 128 may sequentially switch on a series of distribution valves to distribute the filtered grey water into various watering zones of the water usage system 134. The sequential switching may be triggered by the activation of the water pump 130, a predetermined volume of water, and/or a timer. When a soil moisture sensor senses that a watering zone has enough moisture, the soil moisture sensor may switch off a distribution valve that distributes filtered grey water to the watering zone. When each soil moisture sensor senses that each watering zone has enough moisture, the soil moisture sensors may send a signal to the controller 128 to deactivate the water pump 130. The water usage system 134 may include a non-draining mechanism that retains filtered grey water within the pipes of the irrigation system between pump activation periods to provide for a more uniform water distribution.

The filters 106 and 108 include a filter stem 136 that may be accessed via the access opening 138 to remove the filters 106 and 108 from the interceptor 102 for periodic inspection and/or maintenance. The filter stem 136 may be used to attach a plug 140 and/or push the attached plug 140 into the interceptor orifice 120 to stop the flow of filtered grey water to the suction manifold 122 during maintenance. In some embodiments, the filter stem 136 may be sufficiently large to plug the interceptor orifice 120 without the plug 140 when repositioned accordingly.

The system 100 may include a gas pump 142 connected by a gas connector 144 to the filter stem 136 that passes through the filters 106 and 108. The gas pump 142, which may be an air pump, may pump gas through a gas jet 146 beneath the coarse filter 106 and a gas jet 148 beneath the fine filter 108. Although one of each gas jet 146 and 148 are depicted beneath the coarse and fine filters 106 and 108, the filter stem 136 may have any number of gas jets in various locations. Occasionally when the system 100 detects the presence of grey water, such as every fifth detection of grey water, the gas pump 142 delivers gas to the filters 106 and 108 via the filter stem 136. The system 100 may temporarily deactivate the water pump 130 when the gas pump 142 delivers gas to the filters 106 and 108 via the filter stem 136. The gas pump 142 may activate to deliver the gas to the filters 106 and 108 for a specified period of time, such as one minute, and then deactivate, thereby enabling activation of the water pump 130. The frequency with which the gas pump 142 activates and the duration that the gas pump 142 activates may be adjustable based on the needs for cleaning the filters 106 and 108, which may be based on the amount and type of debris in the grey water.

The gas exiting the filter stem 136 at the gas jet 146 beneath the coarse filter 106 and the gas jet 148 beneath the fine filter 108 may rise through the underwater filters 106 and 108 like aerating bubbles in a spa. The rising gas bubbles may raise accumulated debris from the top of the filters 106 and 108 into the water flow path 116, where any grey water overflow may deliver the loosened debris to the sewer outlet 110. The release of gas by the gas jet 146 beneath the coarse filter 106 may loosen the coarse particles, such as hair and lint, on the top of the coarse filter 106 to be taken to the sewer 114 by the grey water overflow. The release of gas by the gas jet 148 beneath the fine filter 108 may loosen the fine particles, such as dust and dirt, on the top of the fine filter 108. The rising gas may push the loosened fine debris upwards through the coarse filter 106 to be taken to the sewer 114 by the grey water overflow. This partial self-cleaning action may require only a small amount of grey water and a short discharge of gas from the gas pump 142, in contrast to water filtration systems that use a large capacity water pump to deliver large amounts of clean or filtered grey water to backwash filters. Because the filters 106 and 108 are backwashed automatically, the system 100 may efficiently reduce the nuisance factor found in other backwash systems which are not fully automatic.

A typical grey water diversion system may also include a filter stem for removing a filter for periodic inspections. A typical grey water diversion system may locate a filter stem in an off-center position as far away from an off-center interceptor orifice as possible to avoid impeding the flow of grey water to the off-center interceptor orifice. For example, when a typical system is viewed from above, a grey water inlet is located towards the north, a sewer outlet is located towards the south, an off-center filter stem is located towards the east, and an off-center interceptor is located towards the west, such that the grey water flowing from north to south is not impeded by the off-center filter stem to the east. However, when the filter in such a system is removed for cleaning, some debris accumulated along the western perimeter of the filter may fall into the off-center orifice located towards the west. In contrast, embodiments of the present disclosure include both the filter stem 136 and the interceptor orifice 120 located at the center of the interceptor 102. Because the interceptor orifice 120 is located central to the interceptor 102, debris accumulated along the perimeter of the filters 106 and 108 may fall to the bottom of the interceptor 102 instead of into the interceptor orifice 120 when the filters 106 and 108 are removed for cleaning by the filter stem 136 through the access opening 138.

The interceptor 102 may include at least one member, such as a member 150 and a member 152 located at a bottom 154 of the interceptor 102. The members 150 and 152 may be located as to support the filters 106 and 108 and/or the central filter stem 136 above the central interceptor orifice 120, thereby enabling the flow of filtered grey water to the central interceptor orifice 120. Although FIG. 1 depicts only member 150 and member 152, the interceptor 102 may include any number of the members 150 and 152 at various locations for this purpose. The member 150 may be connected to the side of the interceptor 102 to support the filters 106 and 108 and/or the filter stem 136, thereby preventing the filters 106 and 108 and/or the filter stem 136 from impeding the flow of filtered grey water to the central interceptor orifice 120. The member 152 may be connected to the bottom of the interceptor 102 to support the filters 106 and 108 and/or the filter stem 136, thereby preventing the filters 106 and 108 and/or the filter stem 136 from impeding the flow of filtered grey water to the central interceptor orifice 120. Each member 152 may be spaced in a pattern on the bottom 154 of the interceptor 102 so as to prevent debris, such as lint and hair, from entering the central interceptor orifice 120 without reducing the flow of the filtered grey water to the central interceptor orifice 120. In typical grey water recovery systems without a hair and lint barrier, such as the member 152, hair and lint that falls to the bottom of the interceptor may eventually enter an unobstructed interceptor orifice and gravitate to the typical system's suction manifold, thereby causing damage to the typical system's water pump.

Furthermore, the central interceptor orifice 120 may be easily plugged for maintenance by the plug 140 on the central filter stem 136, or the central filter stem 136 itself, which is located directly above the central interceptor orifice 120. In contrast, an off-center filter stem must be rotated a significant amount in an attempt to locate and plug the off-center interceptor orifice without the maintenance provider being able to see when the off-center filter stem is aligned with the off-center orifice. For example, the maintenance provider must rotate the off-center filter stem located toward the east of the interceptor to the west of the interceptor even though the maintenance provider may not be able to see through the filter to know when the off-center filter stem is aligned with the off-center orifice. If the off-center filter stem is slightly northwest or slightly southwest of the off-center orifice located toward the west, the off-center filter stem may not be able to plug the off-center orifice. Embodiments of the present disclosure make orifice plugging for maintenance much easier, but without the central filter stem 136 or the filters 106 and 108 impeding the flow of grey water to the central interceptor orifice 120.

The system 100 may also include a raised entry 156 to the interceptor orifice 120 and a strainer 158 to prevent debris from entering the suction manifold 122. The raised entry 156 to the interceptor orifice 120 may prevent debris that accumulates at the bottom 154 of the interceptor 102 from entering the interceptor orifice 120. In typical grey water diversion systems, the interceptor orifice may be flush with the bottom of the interceptor. This flush entry to the interceptor orifice may result in debris that collects in the bottom of the interceptor during routine maintenance eventually entering the unobstructed interceptor orifice and gravitating to the typical system's suction manifold, thereby causing damage to the typical system's water pump. In contrast, the raised entry 156 to the interceptor orifice 120 prevents such debris from entering the interceptor orifice 120, thereby protecting the water pump 130. The strainer 158 may prevent debris that enters the interceptor orifice 120 from entering the suction manifold 122, particularly in the situation when the filters 106 and 108 are inadvertently not returned to the interceptor 102 following routine maintenance.

The water pump 130 may be an oil-cooled water pump. Although an oil-cooled water pump may be more expensive than a water-cooled water pump, an oil-cooled water pump may be less prone to overheating problems due to hot grey water received by the water pump 130 from washing machines and showers, for example.

A problem with debris in the water pump 130, which is distinct from the hot grey water problem, may occur when debris enters the water pump 130 and prevents the water pump 130 from operating. To address this debris in the pump problem, the water pump 130 may include a temperature sensor 160 to deactivate the water pump 130 when the temperature of the water pump 130 becomes too high, which prevents the water pump 130 from damage. The temperature sensor 160 may be a temperature sensor switch or another type of temperature sensor. Cooling the water pump 130 with oil and/or using the temperature sensor 160 preserve the operating life of the water pump 130 may reduce problems caused by hot grey water or debris in the water pump 130, thereby saving expenses.

The system 100 may also include an air vent 162 and an air vent connector 164. The air vent 162 releases air from the adjustable enclosure 124 and is connected to the interceptor 102 via the air vent connector 164. Although FIG. 1 depicts the air vent 162 and the air vent connector 164 as separate elements, the air vent 162 and the air vent connector 164 may be integrated into a single element. The air vent 162 protects the adjustable enclosure 124 from possible air locks. Air locks may prevent the sensor 126 from sensing the presence of the filtered grey water in the suction manifold 122. The air vent connector 164 creates a closed loop for the air vent 162, such that the release of unpleasant smells and health risks may be significantly reduced. Without the air vent connector 164, a grey water backup event may result in grey water exiting the system 100 through the air vent 162. The air vent connector 164 connects the air vent 162 to the enclosed upper portion of the interceptor 102, thus enabling the air vent 162 to perform its venting responsibilities while avoiding direct connection to the outside air. Furthermore, the air vent connector 164 prevents insects access to the suction manifold 122.

The system 100 may include a second interceptor similar to the interceptor 102 located in series or in parallel between the grey water source 112 and the sewer 114. The interceptor 102 and the second interceptor may be installed as one unit between the grey water source 112 and the sewer 114. Similar to the interceptor 102, the second interceptor may have a central interceptor orifice and a central filter stem to enable easier plugging of the central interceptor orifice for maintenance. Also similar to the interceptor 102, the second interceptor may be connected to the gas pump 142 via the second interceptor's filter stem, such that the gas pump 142 delivers gas to the second interceptors filter(s) via the second interceptor's filter stem to automatically backwash the second interceptor's filer(s) on an occasional basis.

If the interceptor 102 and the second interceptor are in series from the grey water source 112 to the sewer 114, when debris accumulates on the filter 106 of the interceptor 102, any grey water overflow that cannot penetrate the accumulated debris may continue along the water flow path to the second interceptor. The second interceptors filter(s) may be sufficiently clear of debris to deliver the grey water to a suction manifold as filtered grey water. The second interceptor's suction manifold may be the same as the suction manifold 122 for the interceptor 102 or another suction manifold. Any grey water overflow that cannot penetrate the debris on the filter 106 of the interceptor 102 may deliver at least part of the debris to the second interceptor and the sewer 114, thereby partially cleansing the filter 106 of the interceptor 102. If debris accumulates on both the filter 106 of the interceptor 102 and the filter of the second interceptor, the grey water overflow that cannot penetrate the accumulated debris may continue along the water flow path 116 to the sewer 114. Because the filters of both interceptors are located along the water flow path 116, the grey water overflow may partially clean some of the accumulated debris off of these filters.

Periodic activations of the gas pump 142 may clear a sufficient amount of the accumulated debris before too much debris accumulates on the filters of both interceptors to permit the delivery of filtered grey water to the suction manifold(s). Combining the partial self-cleaning action based on the overflow of grey water with the partial self-cleaning action provided by the gas pump 142 may result in reducing the maintenance of system filters. Reducing maintenance, enabling easier maintenance, and preserving the operating life of the water pump may combine to enable the grey water diversion system to operate more efficiently and significantly reduce water expenses. While these are some advantages of the present system, various embodiments may not enjoy all of these benefits but still be within the scope of the present disclosure.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A grey water diversion system, comprising:
an interceptor that comprises a grey water inlet, a filter, a sewer outlet, and an interceptor orifice, wherein the filter is located along a bottom of a water flow path from the grey water inlet to the sewer outlet and delivers grey water to the interceptor orifice as filtered grey water;
a gas pump connected to a filter stem, wherein the gas pump delivers gas to the filter via the filter stem in response to the grey water diversion system detecting the presence of the grey water, wherein the gas rises through the filter to raise debris from the filter to the water flow path, and wherein a grey water overflow delivers the debris to the sewer outlet;
a suction manifold that comprises a sensor, wherein the suction manifold receives the filtered grey water from the interceptor orifice, and wherein the sensor detects the presence of the filtered grey water;
a water pump that receives the filtered grey water from the suction manifold, wherein the water pump activates in response to the sensor detecting the presence of the filtered grey water and delivers the filtered grey water into a water usage system.

2. The system of claim 1, wherein the filter comprises a coarse filter and a fine filter.

3. The system of claim 1, wherein the filter stem delivers gas beneath the coarse filter and beneath the fine filter.

4. The system of claim 1, wherein the gas pump is an air pump and the gas is air.

5. The system of claim 1, wherein the suction manifold further comprises an adjustable enclosure that comprises the sensor, wherein the adjustable enclosure is adjusted to be situated at an angle that determines an amount of grey water received by the suction manifold before the sensor detects the presence of the filtered grey water.

6. The system of claim 5, wherein the adjustable enclosure further comprises an air vent connected to the interceptor.

7. The system of claim 1, further comprising a controller that continues activation of the water pump for a predetermined amount of time after the sensor fails to detect the presence of the filtered grey water.

8. The system of claim 7, wherein the controller prevents activation of the pump in response to a sensor detecting that the grey water is associated with at least one of an electrical conductivity above an electrical conductivity threshold and a basicity measure (pH) one of above and below a basicity measure threshold.

9. The system of claim 1, wherein the sensor is a float switch.

10. The system of claim 1, further comprising a second interceptor that comprises a second grey water inlet, a second filter, and a second sewer outlet, wherein the second filter is located along a bottom of a second water flow path from the second grey water inlet to the second sewer outlet and delivers second grey water to a second interceptor orifice as second filtered grey water; wherein the second grey water inlet receives the second grey water from the sewer outlet of the interceptor, and wherein the suction manifold receives the second filtered grey water from the second interceptor orifice.

11. The system of claim 10, wherein the gas pump is connected to a second filter stem, wherein the gas pump delivers second gas to the second filter via the second filter stem in response to the grey water diversion system detecting the presence of the second grey water, wherein the second gas rises through the second filter to raise second debris from the second filter to the second water flow path, and wherein second grey water overflow delivers the second debris to the second sewer outlet.

* * * * *